United States Patent
Morsy

(10) Patent No.: US 11,488,568 B2
(45) Date of Patent: Nov. 1, 2022

(54) METHOD, DEVICE AND SOFTWARE FOR CONTROLLING TRANSPORT OF AUDIO DATA

(71) Applicant: ALGORIDDIM GMBH, Munich (DE)

(72) Inventor: Kariem Morsy, Munich (DE)

(73) Assignee: ALGORIDDIM GMBH, Munich (DE)

( * ) Notice: Subject to any disclaimer, the term of this patent is extended or adjusted under 35 U.S.C. 154(b) by 0 days.

(21) Appl. No.: 17/689,574

(22) Filed: Mar. 8, 2022

(65) Prior Publication Data

US 2022/0199056 A1    Jun. 23, 2022

Related U.S. Application Data

(63) Continuation of application No. PCT/EP2020/081540, filed on Nov. 9, 2020, which is (Continued)

(51) Int. Cl.
*G10H 1/00* (2006.01)

(52) U.S. Cl.
CPC ......... *G10H 1/0008* (2013.01); *G10H 1/0033* (2013.01); *G10H 2210/056* (2013.01); (Continued)

(58) Field of Classification Search
CPC .. G10H 1/00; G10H 1/0025; G10H 2210/066; G10H 7/008; G10H 1/0058;
(Continued)

(56) References Cited

U.S. PATENT DOCUMENTS 10,964,299 B1 *  3/2021  Estes ................ G10H 1/0025
11,024,275 B2 *  6/2021  Estes ................ G10H 1/0066
(Continued)

FOREIGN PATENT DOCUMENTS

WO    WO-2010006276 A2 *  1/2010  ............ G10H 1/125
WO    2019229199 A1       12/2019
(Continued)

OTHER PUBLICATIONS

International Application No. PCTEP2020081540, International Search Report and Written Opinion dated Feb. 5, 2021, 22 pages.
(Continued)

*Primary Examiner* — Marlon T Fletcher
(74) *Attorney, Agent, or Firm* — Kilpatrick Townsend & Stockton LLP

(57) ABSTRACT

A method for processing music audio data, including providing input audio data representing a first piece of music comprising a mixture of musical timbres. The method also includes decomposing the input audio data to generate at least first-timbre decomposed data representing a first timbre selected from the musical timbres of the first piece of music, and second-timbre decomposed data representing a second timbre selected from the musical timbres of the first piece of music. The method also includes applying a transport control to obtain transport controlled first-timbre decomposed data. The method also includes recombining audio data obtained from the transport controlled first-timbre decomposed data with audio data obtained from the second-timbre decomposed data to obtain recombined audio data.

30 Claims, 7 Drawing Sheets

Figure 1:
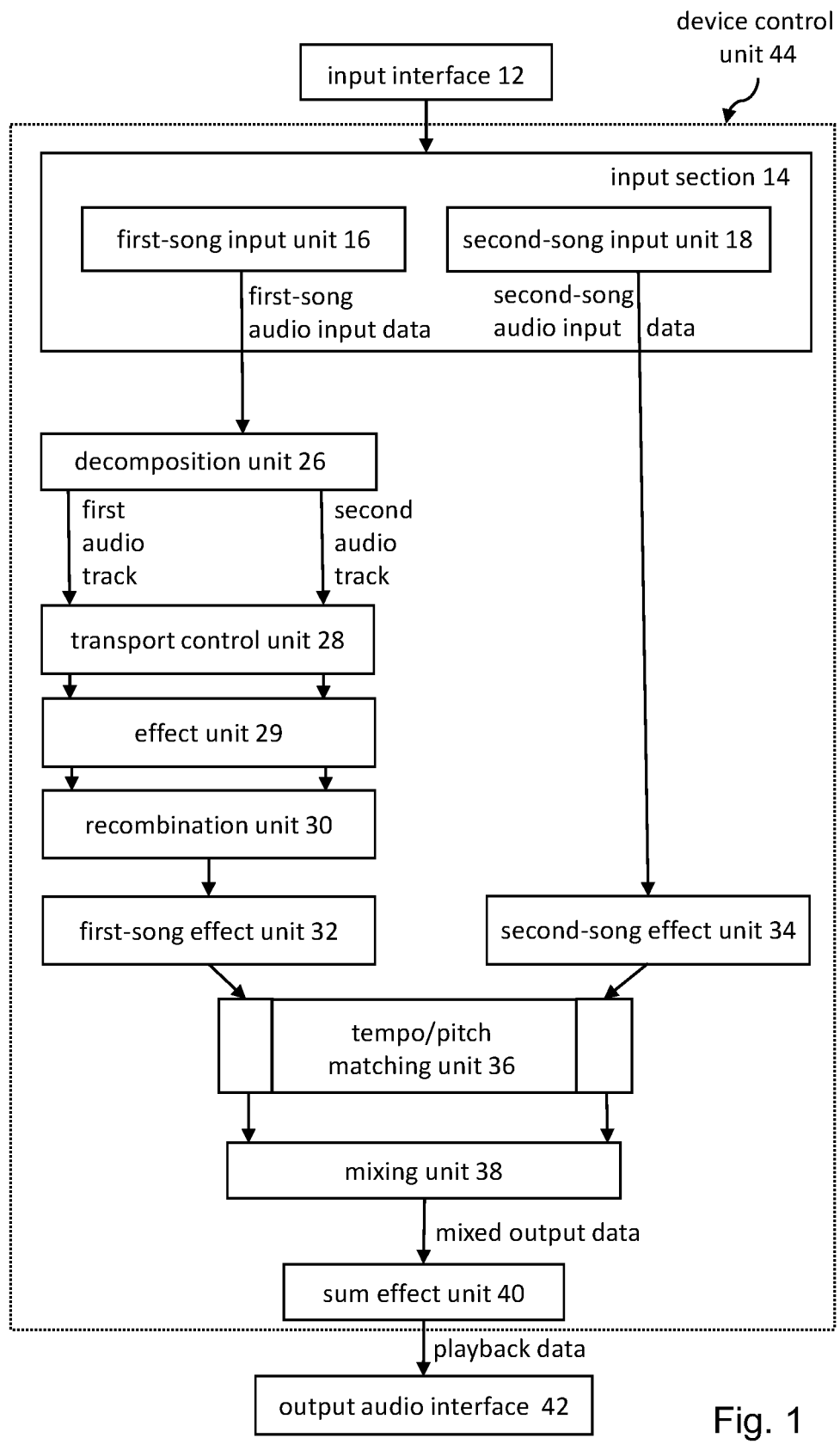

Related U.S. Application Data a continuation-in-part of application No. PCT/EP2020/056124, filed on Mar. 6, 2020, and a continuation-in-part of application No. PCT/EP2020/057330, filed on Mar. 17, 2020, and a continuation-in-part of application No. PCT/EP2020/062151, filed on Apr. 30, 2020, and a continuation-in-part of application No. PCT/EP2020/065995, filed on Jun. 9, 2020, and a continuation-in-part of application No. PCT/EP2020/074034, filed on Aug. 27, 2020, and a continuation-in-part of application No. PCT/EP2020/079275, filed on Oct. 16, 2020.

(52) U.S. Cl.
CPC . *G10H 2210/076* (2013.01); *G10H 2210/125* (2013.01); *G10H 2210/391* (2013.01); *G10H 2220/155* (2013.01); *G10H 2240/325* (2013.01)

(58) Field of Classification Search
CPC ............... G10H 1/08; G10H 2250/035; G10H 2210/155; G10H 2210/105; G10H 1/365; G10H 1/36; G10H 2210/241; G10H 2240/325
See application file for complete search history.

(56) References Cited

U.S. PATENT DOCUMENTS

| | | | | |
|---|---|---|---|---|
| 11,037,538 | B2* | 6/2021 | Estes | ............ G10H 1/38 |
| 2014/0229831 | A1* | 8/2014 | Chordia | .......... G06F 3/04842 |
| | | | | 715/717 |
| 2015/0268924 | A1 | 9/2015 | Torrales, Jr. | |
| 2016/0322039 | A1 | 11/2016 | Siciliano | |
| 2018/0005614 | A1 | 1/2018 | Vilermo et al. | |
| 2018/0122403 | A1 | 5/2018 | Koretzky et al. | |
| 2021/0390938 | A1* | 12/2021 | Morsy | .................. G10H 1/0025 |

FOREIGN PATENT DOCUMENTS

| | | | | |
|---|---|---|---|---|
| WO | WO-2021175461 A1 | * | 9/2021 | ........... G06F 3/0482 |
| WO | WO-2021175464 A1 | * | 9/2021 | ........... G06F 3/0482 |
| WO | WO-2021176102 A1 | * | 9/2021 | ........... G06F 3/0482 |

OTHER PUBLICATIONS

Woodruff et al., "Remixing Stereo Music with Score-Informed Source Separation," Proceedings of the 7th International Conference on Music Information Retrieval, Oct. 18, 2016, 6 pages.

Cano et al., "Musical Source Separation: An Introduction", IEEE Signal Processing Magazine, IEEE Service Center, Piscataway, NJ, US, vol. 36, No. 1, Dec. 24, 2018, pp. 31-40.

"Mixing Console", Wikipedia, Accessed from Internet on Oct. 23, 2020, 16 pages.

International Application No. PCT/EP2020/056124, Invitation to Pay Additional Fees and, Where Applicable, Protest Fee dated Oct. 29, 2020, 15 pages.

International Application No. PCT/EP2020/057330, "Invitation to Pay Additional Fees and, Where Applicable, Protest Fee", dated Nov. 4, 2020, 12 pages.

Roma et al., "Music Remixing and Upmixing Using Source Separation", Proceedings of the 2nd AES Workshop on Intelligent Music Production, XP055743124, Sep. 13, 2016, 2 pages.

* cited by examiner

ND SOFTWARE FOR
METHOD, DEVICE AND SOFTWARE FOR CONTROLLING TRANSPORT OF AUDIO DATA

CROSS REFERENCE TO RELATED APPLICATION

The present application is a Continuation of PCT/EP2020/081540, filed on Nov. 9, 2020, which application claims the benefit of (i) PCT/EP2020/056124, filed on Mar. 6, 2020, (ii) PCT/EP2020/057330, filed on Mar. 17, 2020, (iii) PCT/EP2020/062151, filed on Apr. 30, 2020, (iv) PCT/EP2020/065995, filed on Jun. 9, 2020, (v) PCT/EP2020/074034, filed on Aug. 27, 2020 and (vi) PCT/EP2020/079275, filed on Oct. 16, 2020. The full disclosure of each of the above-referenced priority applications are incorporated herein by this reference in its entirety.

The present invention relates to a method for processing music audio data, comprising the steps of providing input audio data representing a piece of music containing a mixture of predetermined musical timbres and applying a transport control to audio data obtained from the input audio data. Furthermore, the present invention relates to a device for processing music audio data and a software suitable to run on a computer to control the computer to process music audio data.

Methods, devices and software of the above-described type are conventionally known from various applications in the field of music live performance, live mixing, music production, music recording and music broadcasting, etc. Audio processing usually involves certain types of transport control such as to control playback of the audio data with respect to the time domain or modify the audio data with respect to the time domain. The most simple transport controls include a start or a stop of playback, increasing or decreasing playback speed or switching playback direction from forward playback to reverse playback or vice versa. In addition, transport controls may include more complex audio effects such as loop effects, which repeat a certain time interval of the audio data for a number of times, scratch effects, which include alternated forward and reverse playback of short time intervals with varying playback rate, reverb effects, delay effects, etc. For example, conventional DJ equipment usually comprises one or more jog wheels designed similar to conventional vinyl plate holders, which may be operated by a user for alternated forward and backward spin to control a scratch effect. In addition, DJ equipment usually comprises a start or a stop button for controlling a start or stop of playback of an audio track. Likewise, in a digital audio work station (DAW), several tools are available for transport control of audio tracks, for example editing tools for cutting, moving or looping audio data with respect to the time domain or applying other transport control effects, such as time stretching or time compression.

Transport controls usually have a disruptive impact on the playback of the music contained in the audio data, because they usually change the flow of the music in a significant manner. Moreover, music is often ruled by a certain beat, which must continue throughout a piece of music or, if changed, needs to be determined with artistic care in order to avoid a negative impact on the music or music performance. Therefore, transport controls are conventionally difficult to be integrated into music production or music performance without violating continuity and integrity of the music. For example, a stop button of a DJ equipment can usually not be used before the associated audio track has been faded out or before the song has come to an end, since otherwise there would be an immediate break of the performance. Other transport controls, such as scratching effects, looping effects etc., need to be carefully timed in order to preserve the overall beat or beat phase of the song before and after the transport control, which can be difficult, in particular for unexperienced users. In addition to the timing problems, the impact of a transport control to the sound and character of the piece of music is usually significant and it is hardly possible to use a transport control in the right amount for creative purposes.

It is therefore an object of the present invention to increase the functionality of transport controls when processing music audio, in particular to allow for adjusting the impact of transport controls on the continuity and overall character of the music.

In order to achieve the above object, according to a first aspect of the present invention, there is provided a method for processing music audio data, comprising the steps of providing input audio data representing a first piece of music containing a mixture of musical timbres, decomposing the input audio data to generate at least first-timbre decomposed data representing a first timbre selected from the musical timbres of the first piece of music, and second-timbre decomposed data representing a second timbre (different from the first timbre) selected from the musical timbres of the first piece of music, applying a transport control, for example a loop effect, (to the first-timbre decomposed data or to any audio data related to the first timbre during the step decomposition) to obtain transport controlled first-timbre decomposed data, recombining audio data obtained from the transport controlled first-timbre decomposed data with audio data obtained from the second-timbre decomposed data to obtain recombined audio data. Thus as the first-timbre decomposed data may be affected individually and/or differently by the transport control, it will be possible to adjust the impact of the transport control more precisely. For example, a transport control such as a loop effect of audio data may be set to have an impact to only a vocal timbre of the piece of music, whereas instrumental or drum timbres may continue to be played back without interruption.

Preferably, in a time interval after application of the transport control, the transport controlled first-timbre decomposed data and the second-timbre decomposed data are synchronized to one another. Thus the transport control will not have a negative effect to the time integrity of the piece of music as the music will continue unchanged after the transport control has been removed or finished.

According to a second aspect of the invention there is provided a method for processing music audio data, preferably a method according to the first aspect, comprising the steps of providing input audio data representing a first piece of music containing a mixture of predetermined musical timbres which include at least a first timbre and a second timbre different from the first timbre, said input audio data being formed by a plurality of consecutive input frames; decomposing the input audio data to obtain first-timbre decomposed data representing the first timbre and second-timbre decomposed data representing the second timbre, such that frames of the first-timbre decomposed data are associated to associated input frames and contain the first-timbre component of the associated input frames, and frames of the second-timbre decomposed data are associated to associated input frames and contain the second-timbre component of the associated input frames, and wherein a first frame of the first-timbre decomposed data and a first frame of the second-timbre decomposed data are associated to different input frames; and recombining the first frame of the first-timbre decomposed data with the first frame of the second-timbre decomposed data to obtain a first frame of recombined audio data.

It should be noted that in the present disclosure an audio frame, such as an input frame or a frame of the first- or second-timbre decomposed data, or a frame of recombined data, refers to the smallest data unit of audio data, usually corresponding to one audio sample of the audio data. Digital audio data usually comprise of a plurality of consecutive audio samples or audio frames, wherein each sample or frame stores therein the signal value (e.g. a measured average value) within a sampling period T. The sampling period T is given by T=1/fs, wherein fs denotes the sampling rate, which may be 44.1 kHz or 48 kHz for common audio files for example.

As an effect of the features of the present invention, the input audio data are decomposed to obtain first-timbre decomposed data and second-timbre decomposed data, wherein timing of the first-timbre decomposed data and/or the second-timbre decomposed data is modified (also denoted as transport control) resulting in a difference between the timing or order of the frames of the first-timbre decomposed data and the second-timbre decomposed data with respect to the timing or order of the associated input frames, such that at least one frame of the recombined audio data will originate from different input frames. As the first-timbre decomposed data and the second-timbre decomposed data may be affected individually and/or differently by such transport control, it will be possible to adjust the impact of the transport control more precisely. For example, a transport control such as stop of playback or looping of audio data may be set to have an impact to only a vocal timbre of the piece of music, whereas other audio tracks, such as other decomposed tracks containing other timbres, continue to be played back without interruption. The transport control of (only) the vocal timbres may therefore be used as a creative effect that does not influence the continuity and flow of the music as the latter is carried, for example, by drum timbres or harmonic timbres of the piece of music.

In the present disclosure, a transport control is defined as controlling audio data or controlling the processing of audio data with respect to the time domain, in particular controlling of the timing of audio frames included in the audio data. Transport controls are thus to be distinguished from mere sound effects such as equalizer effects, which change the waveform of the audio signal without influencing the timing of audio frames. Transport controls are also to be differentiated from volume controls, which merely scale the signal strength without modification to the shape of the waveform and without changing the timing or order of audio frames. In addition, timing controls are to be differentiated from muting or unmuting operations, which just switch the audio signal to zero or back to the original value, however, without modifying the playback speed, interrupting or resuming playback and without changing the audio data with respect to the timing of audio frames.

In this respect, the transport control in the present invention may change the timing of audio frames of individual decomposed audio data. In particular, the transport control may preferably include at least one of a loop effect (repeating a certain portion or a time interval of the audio data in succession one after another for a number of times), a loop roll or slip loop effect (standard loop effect which when turned off skips to the playback position where playback would have been if the loop effect had not been applied), a beat masher effect (shifts and/or repeats audio frames that occur at certain times in a bar, e.g. every quarter note/beat, and/or adds rhythmic variation to the music), a back-spin effect (changing playback direction to reverse playback and varying playback rate continuously from fast to slow, while gradually reducing the mean playback rate to 0 for a predetermined time interval), a scratch effect (alternated forward and reverse playback with varying playback rate of a portion or time interval of the audio data), a vinyl brake effect (gradual slow-down of the playback or reducing playback speed to zero within a predetermined time interval, simulating the typical effect of stopping vinyl on an analog turntable), a stop control (stopping playback with or without additional sound effect), a play control (starting playback with or without an additional sound effect), and a cue jump (stopping playback and quickly resuming playback at a different position in the time domain within the audio data, said different position being preferably a marked position that has been marked by a user).

The transport control may be configured such that the first-timbre decomposed data include frames not associated to any input frame but containing any other audio signals, for example silence, reference values or values calculated (e.g. extrapolated or intrapolated) from audio signals of other input frames.

When applying the principles of the present invention to transport controls of the above list, the effects become usable for the most common transport controls of DJ equipment, DAW's or other audio processing equipment, allowing a user, for example a DJ, to implement the invention in a familiar environment, ensuring easy and flexible application of the invention in practice.

In general, a transport control may be set to affect a piece of music over the entire length of the piece of music, i.e. may affect all frames of the first-timbre decomposed data. However, in a preferred embodiment of the present invention, the method further includes recombining a second frame of the first-timbre decomposed data with a second frame of the second-timbre decomposed data to obtain a second frame of recombined audio data, wherein the second frame of the first-timbre decomposed data and the second frame of the second-timbre decomposed data are associated to the same input frame. According to this embodiment, the transport control is applied only to some of the frames of first- and second-timbre decomposed data such that these frames are associated to different input frames, i.e. such as to effectively shift their timings relative to one another, whereas other frames of first- and second-timbre decomposed data, i.e. the second frame, are not affected by the transport control and thus originate from the same input frame, i.e. they are not shifted in their timings relative to one another. Thus, even if during application of the transport control first-timbre decomposed data and second-timbre decomposed data may be out of time, they will be synchronized again if the application of the transport control is terminated. In other words, in such an embodiment, the transport control does not affect the overall time integrity of the first-timbre decomposed data and the second-timbre decomposed data relative to one-another, before and after application of the transport control. This means that the first-timbre decomposed data, even after application of the transport control, can be easily recombined with the second-timbre decomposed data, without a phase shift between both audio data.

In another embodiment of the invention, the second-timbre decomposed data include a plurality of consecutive frames associated biuniquely and in the same order to consecutive input frames of the input audio data. The second timbre will therefore progress continuously and without change of timing (without transport control), while the first timbre may receive the transport control.

In another embodiment of the invention, the first-timbre decomposed data and the second-timbre decomposed data each include a first group having a plurality of frames and a second group having a plurality of frames, wherein the first group of the first-timbre decomposed data and the first group of the second-timbre decomposed data have the same number of frames, and the second group of the first-timbre decomposed data and the second group of the second-timbre decomposed data have the same number of frames, wherein, in the step of recombining, frames of the first group of the first-timbre decomposed data are recombined biuniquely with frames of the first group of the second-timbre decomposed data, and frames of the second group of the first-timbre decomposed data are recombined biuniquely with frames of the second group of the second-timbre decomposed data. Then, when recombining the frames of the first groups of the first- and second-timbre decomposed data, frames are recombined with one another which (at least partially) are associated to different input audio frames, and when recombining the frames of the second groups of the first- and second-timbre decomposed data, frames are recombined with one another which are (substantially all) associated to the same input audio frames. Thus within a first time interval corresponding to the recombination of the first groups, the transport control is applied to affect the first- or second decomposed data, whereas within a second time interval corresponding to the recombination of the second groups, the first- and second decomposed data are recombined in a synchronized manner, such that the integrity of the piece of music is preserved in parts where no transport control is applied and the transport control can thus be used more sensitive or well-adjusted as a creative effect.

As an alternative embodiment, the first- and second-timbre decomposed data may be recombined in a time-shifted manner in a time interval after application of the transport control. The shift may be equal to the length of a beat or multiples of the beat for improving musical matching of the first and second output tracks. However, for specific purposes of creative mixing, the shift may be different from the length of a beat or multiples of a beat.

As a result, in the embodiments described above, a user may freely use transport controls for various purposes, such as for achieving specific artistic effects adjusted to the right amount of influence to the character of the music and without interrupting the flow of the music.

The transport control provided by the present invention may be configured to set associations between each of the frames of the first group of first-timbre decomposed data and the associated input frames, such that each frame contains the first-timbre component of the associated input frame. This may be realized either by controlling decomposition directly, i.e. controlling which input frame is to be decomposed into which first frame of the first-timbre decomposed data, or by controlling or changing the order or timing of the frames of the first group of the first-timbre decomposed data, i.e. after decomposition.

In the context of the present invention input audio data are preferably provided by reading mono, stereo or multichannel audio files containing one (mono), two (stereo) or more (multichannel) mixed audio tracks of a piece of music. The mixed audio tracks may be produced in recording studios by mixing a plurality source tracks, which are programmed on a computer (for example a drum computer) or obtained from directly recording individual instruments or vocals. In other cases, mixed audio tracks are obtained from live recording of a concert or from recording the output of a playback device, for example a vinyl player. Mixed audio tracks are often distributed by music distributors via streaming or downloads or broadcasted by radio or TV broadcasting services.

According to the present invention, input audio data are decomposed to generate first-timbre decomposed data representing a first timbre and second-timbre decomposed data representing a second timbre of the first piece of music, different from the first timbre, and optionally any additional decomposed data representing additional timbres of the same first piece of music, wherein the different decomposed data represent different timbres, i.e. different components of the sound of the piece of music. It should be noted that in the present invention a musical timbre may actually include a combination or mix of different single timbres, such as a combination of different musical instruments or other sound components. In particular, a musical timbre may be a vocal timbre which includes one vocal component of a vocalist or a plurality of vocal components of a group of vocalists. Further a musical timbre may be an instrumental timbre of a musical instrument or of a group of musical instruments. As a further example, the first musical timbre may include a single timbre of a single vocalist, whereas the second musical timbre may include all remaining single timbres of the piece of music, i.e. all sound components except the single vocal timbre.

Furthermore, first- and second-timbre decomposed data may be complementary data, which means that the sum of the first- and second-timbre decomposed data may be substantially equal to the original input audio data. Likewise, the method may decompose the input audio data to generate separated data of more than two decomposed timbres, each being different timbres selected from the predetermined timbres of the first piece of music, wherein each timbre may itself be a single musical timbre of a single vocal or a single musical instrument or the like, or may be formed by a combination of a plurality of single musical timbres. Again, the plurality of decomposed timbres may form complimentary timbres, such that the audio data of the sum of all decomposed data are substantially equal to the input audio data.

In a further embodiment of the invention, the first musical timbre is a harmonic vocal timbre (a vocal timbre having melodic components or containing actual notes of different pitches according to the key/harmonies of the music) or a harmonic instrumental timbre (an instrumental timbre having melodic components or containing actual notes of different pitches according to the key/harmonies of the music, for example a timbre including at least one of bass, guitars, piano, strings, etc.), or a combination of a harmonic vocal timbre and a harmonic instrumental timbre (denoted as a melodic timbre, for example a timbre which includes all signal components except drums/percussion and bass) and/or the second musical timbre is a non-harmonic vocal timbre or a non-harmonic instrumental timbre, preferably a drum/percussion timbre. Such combination of several timbres allows to apply the transport control faster and more targeted to specific components of the music at once.

Methods according to the first or second aspects of the invention use a step of decomposing input audio data to obtain first-timbre decomposed data (first decomposed track) representing a first timbre and second-timbre decomposed data (second decomposed track) representing a second timbre. Several decomposing algorithms and services are known in the art as such, which allow decomposing audio signals to separate therefrom one or more signal components of different timbres, such as vocal components, drum components or instrumental components. Such decomposed signals have been used in the past to create certain artificial effects such as removing vocals from a song to create a karaoke version of a song, and they could be used for the step of decomposing the input audio data in a method of the present invention.

However, in preferred embodiments of the present invention, the step of decomposing the input audio data may include processing the input audio data by an AI system containing a trained neural network. An AI system may implement a convolutional neural network (CNN), which has been trained by a plurality of data sets for example including a vocal track, a harmonic/instrumental track and a mix of the vocal track and the harmonic/instrumental track. Examples for conventional AI systems capable of separating source tracks such as a singing voice track from a mixed audio signal include: Prétet, "Singing Voice Separation: A study on training data", Acoustics, Speech and Signal Processing (ICASSP), 2019, pages 506-510; "spleeter"—an open-source tool provided by the music streaming company Deezer based on the teaching of Prétet above, "PhonicMind" (https://phonicmind.com)—a voice and source separator based on deep neural networks, "Open-Unmix"—a music source separator based on deep neural networks in the frequency domain, or "Demucs" by Facebook AI Research—a music source separator based on deep neural networks in the waveform domain. These tools accept music files in standard formats (for example MP3, WAV, AIFF) and decompose the song to provide decomposed/separated tracks of the song, for example a vocal track, a bass track, a drum track, an accompaniment track or any mixture thereof.

In a further preferred embodiment of the invention, the recombined audio data are further processed, preferably stored in a storage unit, and/or played back by a playback unit and/or mixed with second-song output data. This allows to use the method of the invention with audio equipment such as a DJ device/software or a DAW. Preferably, obtaining the recombined audio data and/or further processing the recombined audio data is performed within a time smaller than 5 second, preferably smaller than 200 milliseconds, after the start of decomposing the input audio data. This has the advantage that there is no need to preprocess the input audio data before applying the transport control, but the transport control can be used immediately when it is actually needed, for example during a live performance of a DJ. For example, if the time between decomposition and further processing of the audio data is smaller than 200 milliseconds, a DJ can perform a loop effect basically immediately during a live performance.

In a further embodiment of the invention, the method may include the additional steps of providing second-song input data representing a second piece of music, obtaining second-song output data from the second-song input data, mixing the recombined audio with the second-song output data to obtain sum output data, and preferably playback of audio data obtained from the sum output data. This embodiment may especially be used in a DJ device to mix and crossfade two songs or to select, mix and crossfade musical timbres of the two songs for live performance.

In order to further increase usability of the method of the invention for a DJ device, the method may further comprise at least one of key matching, tempo matching or beat phase matching. In particular, for key matching the method may comprise the steps of determining a pitch shift value representative of a difference between a first key of the first piece of music and a second key of the second piece of music, and shifting the pitch of audio data related to the first piece of music and/or audio data related to the second piece of music according to the pitch shift value, before the step of mixing the recombined audio data with the second-song output data to obtain sum output data. Furthermore, for tempo matching, the method may comprise the steps of determining a tempo shift value representative of a difference between a first tempo of the first piece of music and a second tempo of the second piece of music, and shifting the tempo of audio data related to the first piece of music and/or audio data related to the second piece of music according to the tempo shift value, before the step of mixing the recombined audio data with the second-song output data to obtain sum output data. Furthermore, for beat phase matching, the method may comprise the steps of determining a beat phase shift value representative of a difference between the beat phases of the first piece of music and the second piece of music, and time shifting audio data related to the first piece of music and/or audio data related to the second piece of music according to the beat phase shift value, before the step of mixing the recombined audio data with the second-song output data to obtain sum output data.

According to a third aspect of the present invention, the above object is achieved by a device for processing music audio data, an input unit for receiving input audio data representing a first piece of music containing a mixture of predetermined musical timbres, a decomposition unit for decomposing the input audio data received from the input unit to generate at least a first decomposed track representing a first musical timbre selected from the predetermined musical timbres of the first piece of music, a transport control unit adapted to be operated by a user for applying a transport control for controlling transport of the first decomposed track with respect to time, and a recombination unit for recombining audio data obtained from the first decomposed track with audio data obtained from the second decomposed track to obtain recombined audio data.

A device of the third aspect can be formed by a computer having a microprocessor, a storage unit an input interface and an output interface, wherein at least the input unit, the decomposition unit, the transport control unit and the mixing unit are formed by a software program running on the computer. In this manner, the computer is preferably adapted to carry out a method according to the first and/or second aspect of the invention.

A device of the third aspect of the invention may be configured to carry out a method according the first and/or second aspect of the invention, and in particular according to any of the above described embodiments or features of the first and/or second aspect of the invention, such as to achieve the same or corresponding effects as described above.

Preferably the device of the third aspect of the invention is configured such that the transport control does not change the integrity of the piece of music with respect to the time domain, to allow easy mixing of the first output track with other audio tracks. In a technically simple embodiment, such effect can be achieved, if the device comprises a first audio path for transmitting audio data of the first decomposed track from the decomposition unit via the transport control unit to the mixing unit, a second audio path for transmitting audio data of the first decomposed track from the decomposition unit to the mixing unit while bypassing the transport control unit, and a path switch for switching the device between transmission of audio data via the first audio path and transmission of audio data via the second audio path.

The transport control unit may comprise a switch control element adapted to be operated by a user such as to control the path switch.

The transport control unit may comprises an audio buffer adapted to store therein audio data obtained from applying the transport control to audio data of the first decomposed track. Thus during application of the transport control, the first output track may be generated by reading audio data from the audio buffer, while in time intervals in which the transport control is not applied, the first output track may be generated directly by reading audio data from the first decomposed track. Furthermore, for example, if the transport control is a loop effect, the audio buffer may contain audio data associated to one loop, wherein the first output track may be generated by repeatedly reading the audio buffer for a predetermined number of times or until the loop effect is removed by the user. Alternatively, the audio buffer may contain audio data obtained from applying the transport control to the input audio data. Thus during application of the transport control, the first output track may be generated by reading audio data from the audio buffer and decomposing these audio data, while in time intervals in which the transport control is not applied, the first output track may be generated by decomposing the input audio data directly.

In another embodiment of the invention, the transport control unit may comprise at least one of a jog wheel, a play/pause/button, a cue jump button, and a loop button for controlling the transport control. Such control elements are conventionally known as such in DJ devices or similar audio processing devices, which allows fast and intuitive usage of the device. Furthermore, conventional DJ devices and stand-alone hardware controllers including such control elements, for example MIDI devices, may be easily retrofitted to obtain a device according to the invention, by adding a decomposition unit and rerouting the transport controls operated through the conventional control elements towards a decomposed track obtained from the decomposition unit.

In another embodiment of the invention, the transport control unit may comprise a parameter control element, which is adapted to allow a user to control at least one timing parameter of the transport control. A timing parameter may be a duration of a time control, a time period or time interval selected as a loop for a loop effect, or a time period or time interval selected for forward or reverse playback of a scratch or stop/vinyl brake effect. Preferably, the timing parameter is set or can be set by a user based on a tempo value (BPM value) of the piece of music (for example a 2 beat interval at a tempo of 120 beats per minute which would equal a 1 second time interval), in order to match the onset or duration of the transport control to the beat of the piece of music. The tempo value may be detected by a tempo detecting unit of the device or may be obtained from a user input or through metadata of the piece of music.

Moreover, the transport control unit may comprise a routing control element, which is adapted to allow a user to select a destination track from a group of at least two different audio tracks each being derived from the input audio data, wherein the group in particular includes at least one decomposed track and/or a combination of decomposed tracks, in particular the remainder of the input audio data (i.e. the input audio data minus a selected decomposed track) and/or an audio track formed by audio data substantially equal to the input audio data, and wherein the transport control unit applies the transport control to the destination track.

The decomposition unit preferably includes an AI system containing a trained neural network, wherein the neural network is trained to separate audio data of a predetermined musical timbre from audio data containing a mixture of different musical timbres. As described above, such AI systems are able to separate different musical timbres of a song with high quality.

A device of the third aspect of the invention may further comprise a storage unit adapted to store the recombined audio data, which allows further processing of the recombined audio data, for example at any later point in time. In another embodiment, the device may have a playback unit adapted to play back the recombined audio data, such that the device is prepared to be used as a music player or for public audition of music through connection to a PA system. In another embodiment, the device may have a mixing unit adapted to mix the recombined audio data with second-song output data, which allows the use of the device as DJ equipment.

In an embodiment of the invention the device is a DJ device. For use as a DJ device, the device may comprise a mixing unit adapted to mix recombined audio data with second-song output data obtained from the second-song input data, such as to obtain mixed output data, and preferably a playback unit adapted to play back playback data obtained from the mixed output data. To obtain a fully integrated DJ system, in which the automatic tempo/key matching described above is directly available as a feature, the device may further comprise a second-song input unit for providing second-song input data representing a second piece of music, a mixing unit adapted to mix the recombined audio data with second-song output data obtained from the second-song input data, such as to obtain mixed output data, and a crossfading unit having a crossfading controller that can be manipulated by a user to assume a control position within a control range, wherein the crossfading unit sets a first volume level of the recombined audio data and a second volume level of the second-song output data depending on the control position of the crossfading controller, such that the first volume level is maximum and the second volume level is minimum when the crossfading controller is at one end point of the control range, and the first volume level is minimum and the second volume level is maximum when the crossfading controller is at the other end point of the control range.

A device of the second embodiment of the invention may further include an effect unit, which is configured to apply one or a plurality of different audio effects (such as Equalizer controls, reverb effects, delay effects etc.) to either one single decomposed track or to a plurality, but preferably not all, of different decomposed tracks of the same input audio data (of the same piece of music). For example, the effect unit may apply a first audio effect to a first decomposed track, and a second audio effect different from the first audio effect to a second decomposed track different from the first decomposed track, wherein an effect routing element may be configured to allow a user to control which audio effect is applied to which decomposed track. Another effect unit may be provided to apply one or more additional audio effects to the recombined audio data or the sum output data.

According to a fourth aspect of the present invention, the above mentioned object of the invention is achieved by a software adapted to run on a computer to control the computer such as to carry out a method of the first and/or second aspect of the invention. Such software may be executed/run on known operating systems and platforms, in particular iOS, macOS, Android or Windows running on computers, tablets, and/or smartphones. The software may be a digital audio workstation (DAW) or a DJ software.

Figure 2:
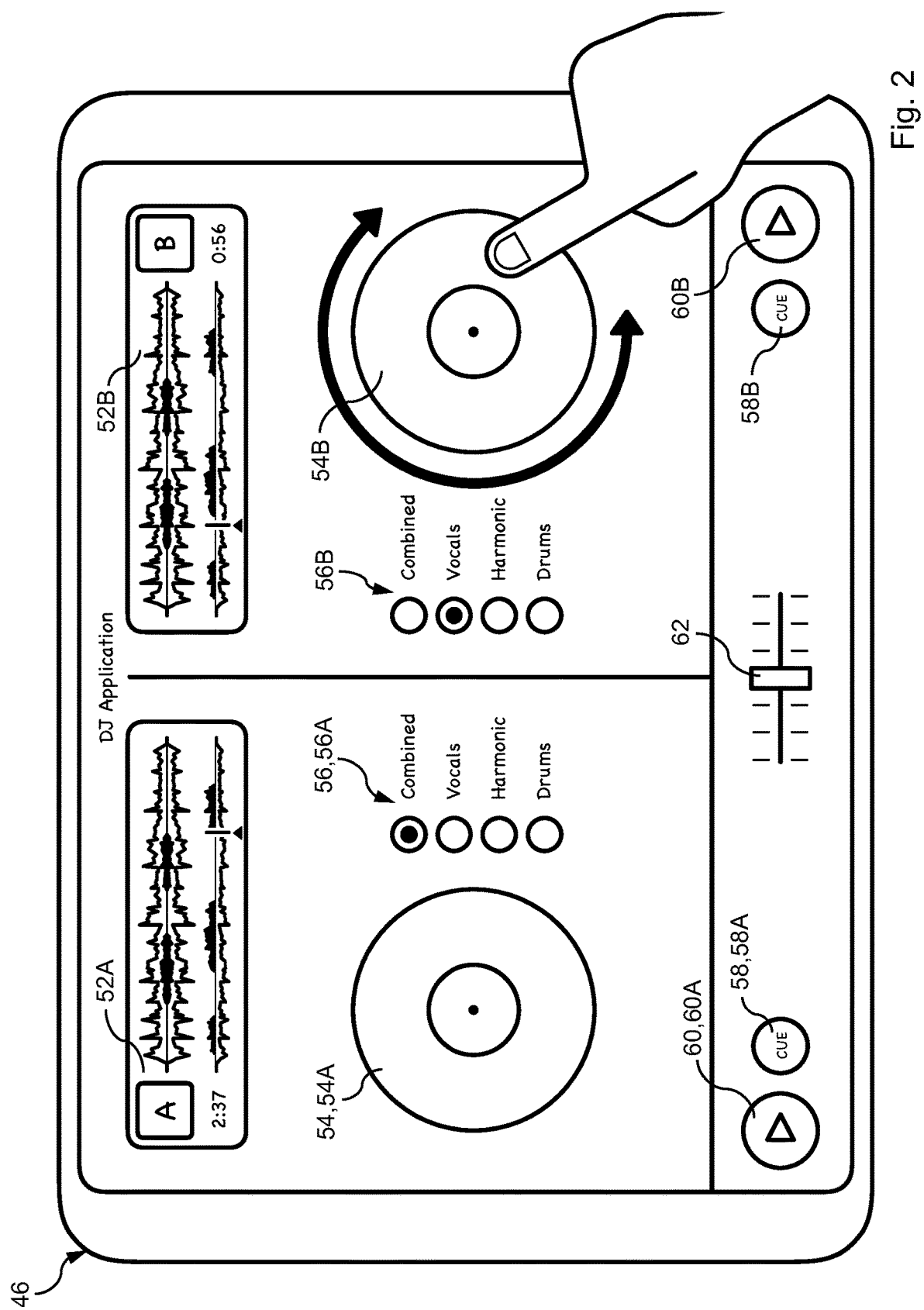
Figure 3:
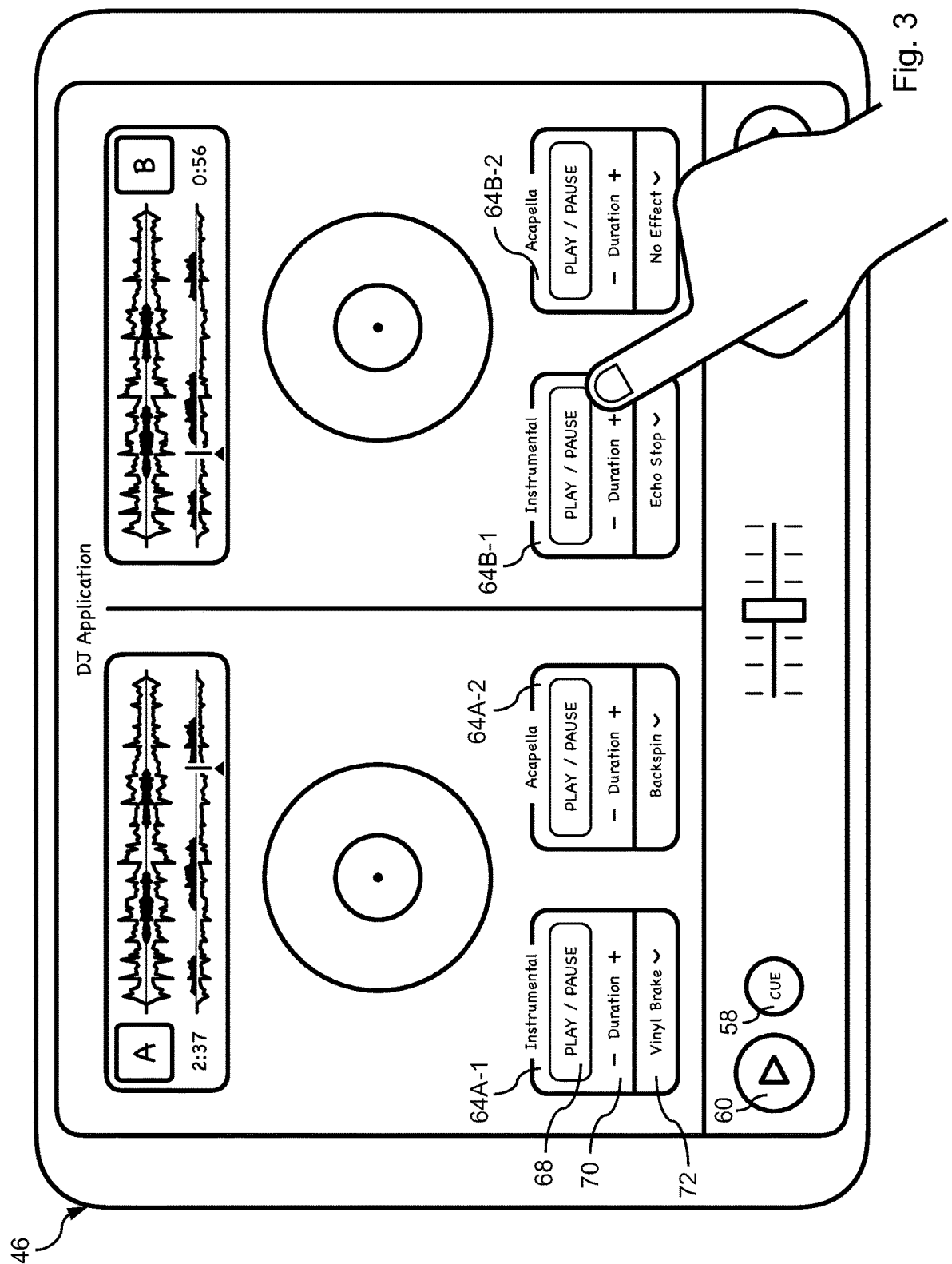
Figure 4:
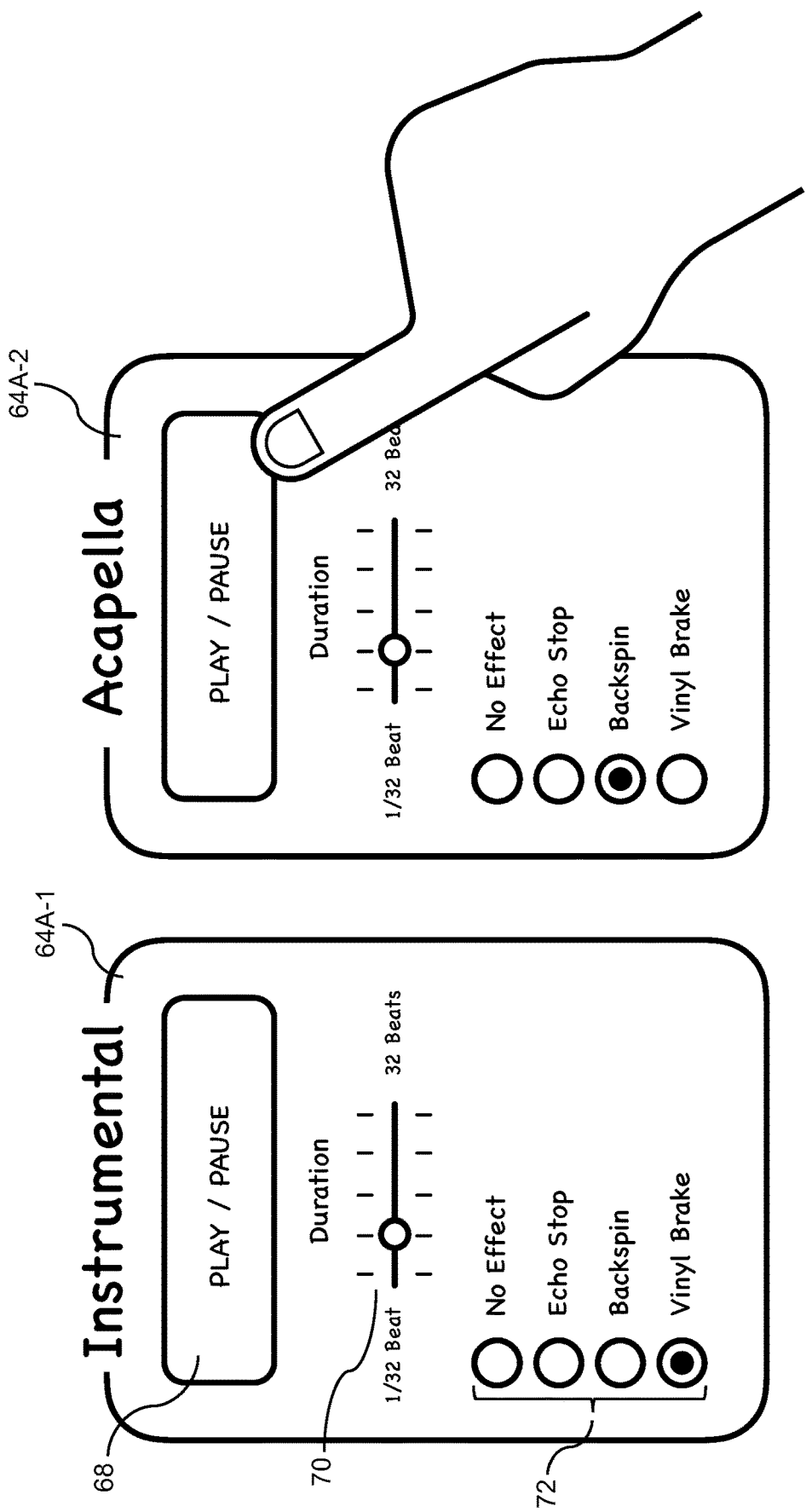
Figure 5:
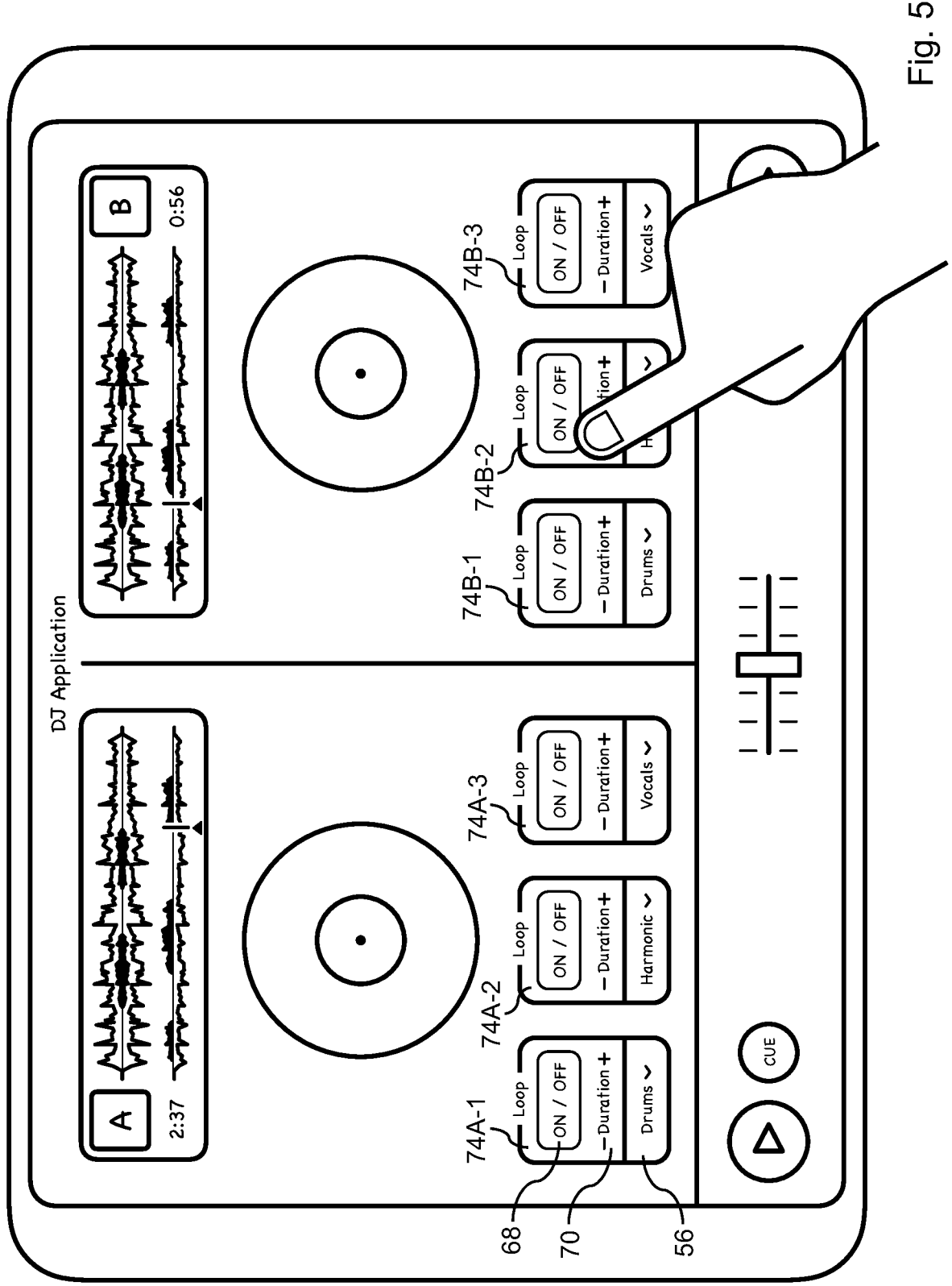
Figure 6:
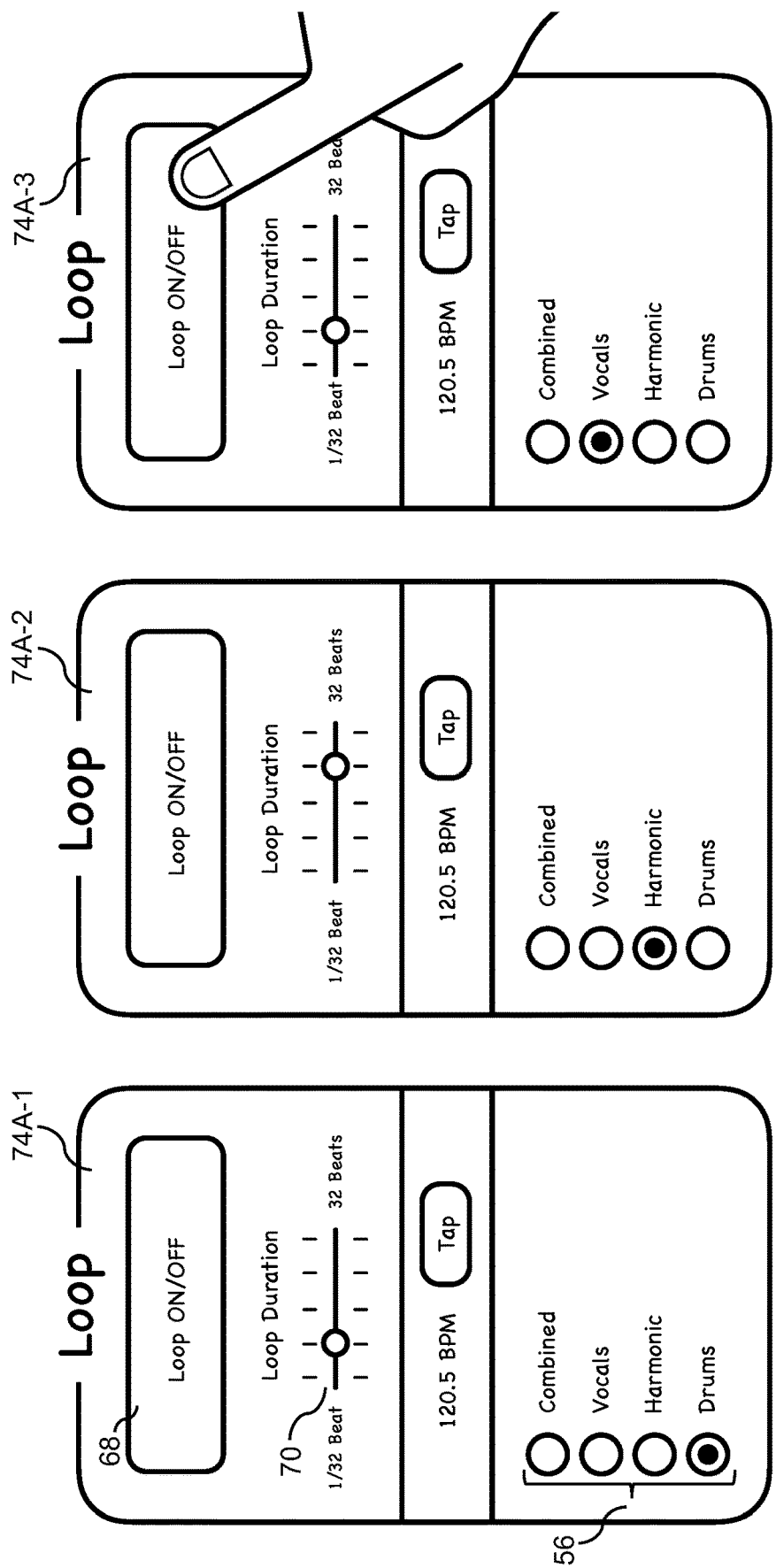
Figure 7:
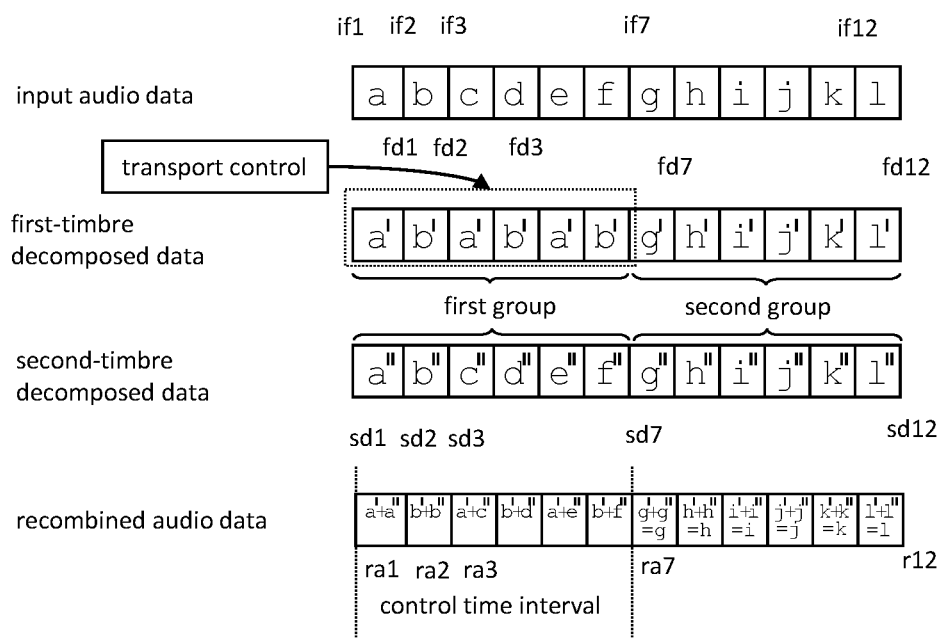

Embodiments of the present invention will now be described in more detail with respect to the drawings, in which FIG. 1 shows a diagram outlining components of an audio processing device according to a first embodiment of the present invention, FIG. 2 shows a user control section allowing a user to control the device of the first embodiment, FIG. 3 shows a user control section according to a second embodiment of the present invention, FIG. 4 shows a modification of the user control section according to the second embodiment of the present invention, FIG. 5 shows a user control section according to a third embodiment of the present invention, FIG. 6 shows a modification of the user control section according to the third embodiment of the present invention, and FIG. 7 shows a diagram illustrating a transport control method for a transport control of audio data as used in the first and/or second embodiment of the invention.

In FIG. 1, components of a device according to a first embodiment are shown, which may all be integrated as hardware components or as software modules installed in a computer, for example a tablet computer or a smartphone. Alternatively, these hardware components or software modules may be part of a stand-alone DJ device, which includes a housing on which hardware control elements such as control knobs or sliders may be mounted to control functions of the device.

The device may include an input interface 12 for receiving input audio data or audio signals. The input interface 12 may be adapted to receive digital audio data as audio files via a network or from a storage medium. Furthermore, the input interface 12 may be configured to decode or decompress audio data, when they are received as encoded or compressed data files. Alternatively, the input interface 12 may comprise an analog-digital converter to sample analog signals received from an analog audio input (for example a vinyl player or a microphone) in order to obtain digital audio data as input audio data.

In general, the input audio data are included in mono or stereo audio files containing one (mono) or two (stereo) audio tracks of a piece of music. The audio files may be produced in a recording studio by mixing a plurality of source tracks or may be obtained from live recording of a concert or the like. In particular, input audio data may be provided in the form of audio files received from music distributors via streaming or downloading or broadcasting.

The input audio data provided by input interface 12 are routed to an input section 14 that contains a first-song input unit 16 and a second-song input unit 18, which are adapted to provide audio data of two different songs according to a user selection. In particular, the device may have a user input interface, for example a touchscreen, to allow a user to choose songs from a song database and to load it into the first song input unit 16 or the second song input 18. The audio file of the selected song may be completely loaded into a local memory of the device or portions of the audio file may be continuously streamed (for example via internet from a remote music distribution platform) and further processed before receiving the entire file. In this way, the first-song input unit 16 provides first-song audio input data according to a first song (song A) selected by a user, and the second-song input unit 18 provides second-song audio input data according to a second song (song B) selected by a user.

The first-song audio input data may then be routed to a decomposition unit 26, which contains an AI system having a trained neural network adapted to decompose the first-song audio input data to generate at least a first decomposed track representing a first musical timbre of the first song and preferably also a second decomposed track representing a second musical timbre and/or any further decomposed tracks representing further musical timbres of the first song.

At least the first decomposed track, preferably all decomposed tracks, are then routed to an transport control unit 28, which is adapted to individually modify the first decomposed track or any other decomposed track by application of a transport control as will be described below.

Optionally, at least one, preferably all decomposed tracks, on may also be passed through an effect unit 29, which is adapted to individually apply one or more audio effects to the at least one decomposed track or to selected decomposed tracks.

If the decomposition unit 26 produces more than one decomposed track, the decomposed tracks, after having passed the transport control unit 28 and/or the effect unit 29, may be routed to a mixing unit 30 in which they are mixed or recombined again to form a mixed audio track (mono or stereo).

The mixed audio data obtained from mixing unit 30 may then be passed through a first-song effect unit 32 in order to apply some audio effect, such as a high-pass or low-pass filter, or an EQ filter, if desired.

On the other hand, the second-song audio input data obtained from the second-song input unit 18 may be processed by similar or different units as used for the first-song audio input data. In the illustrated example, the second-song audio input data are passed through a second-song effect unit 34 in order to apply an audio effect, such as a high-pass or low-pass filter, or an EQ filter.

Audio data obtained from the first-song audio input data and audio data obtained from the second-song audio input data may then be passed through a tempo/key matching unit 36 which detects a tempo (BPM value) and/or a key (harmonic key) of both songs and changes the tempo and/or the pitch/key of at least one of the two songs, such that both songs have matching tempi and/or matching keys. Matching tempi means that the BPM value of one of the two songs equals the BPM value or a multiple of the BPM value of the other song. Matching key means that the two songs have the same or matching harmonic keys. Such tempo matching units or key matching units are known in the art as such. In addition, tempo/key matching unit 36 may time shift at least one of the two songs in order to match the beat phases of the two songs.

Afterwards, audio data obtained from the first-song audio input data and audio data obtained from the second-song audio input data may be routed into a mixing unit 38, in which they are mixed with one another to obtain mixed output data (mono or stereo) that contain a sum of both signals. Mixing unit 38 may contain or may be connected to a crossfader, which can be manipulated by a user to assume a control position within a control range, wherein the crossfader sets a first volume level of the audio data obtained from the first-song audio input data and a second volume level of the audio data obtained from the second-song audio input data depending on the control position of the crossfading controller, such that the first volume level is maximum and the second volume level is minimum when the crossfading controller is at one end point of the control range, and the first volume level is minimum and the second volume level is maximum when the crossfading controller is at the other end point of the control range. Mixing unit 38 then mixes (sums) the audio data of the first-song and second-song according to the first volume level and the second volume level, respectively, to obtain mixed output data (mono or stereo).

The mixed output data may then be passed through a sum control unit 40 to apply any further transport control and/or any further audio effect, if desired. The output of the sum control unit 40 may be denoted as playback data and may be played back by an output audio interface 42. Output audio interface 42 may include an audio buffer and a digital to analog converter to generate a sound signal. Alternatively, the playback data may be transmitted to another device for playback, storage or further processing.

The device of the first embodiment as described above may be controlled through a device control unit 44 having a user control section 46 to be operated by a user. User control section 46 may comprise a display device for displaying information about an operating condition of the device or for visualizing audio data and/or control elements. In addition, user control section 46 may further comprise control elements that can be operated by a user to control the functions of the device, in particular the functions of the sections and units described above with reference to FIG. 1.

FIG. 2 shows a layout of the user control section 46 of device control unit 44 according to the first embodiment of the invention. Elements shown in the layout and described in the following may be displayed by a suitable display operated by a software running on the device. Alternatively or in addition, this layout or parts thereof may be realized by hardware design, for example of a DJ device, and the control elements may be realized by hardware control knobs, sliders, switches and so on.

In the first embodiment, the user control section 46 of device control unit 44 may display a song-A section 52A associated to the first-song input unit 16, which indicates the first song (song A). For example, song-A section 52A may be controllable by a user to select song A among a plurality of songs. Furthermore, the user control section 46 may comprise a song-B section 52B indicating a second song (song B) and being controllable by a user to select song B.

Furthermore, the user control section 46 may comprise several control elements such as at least one of a scratch control element 54, a routing control element 56, a cue control element 58, and a play/stop control element 60. These control elements 54, 56, 58 and 60 are configured to control transport controls in the sense of the present invention. The control elements 54 to 60 may be provided in duplicate for each of song A and B. Thus, at least one of a first scratch control element 54A, a first routing control element 56A, a first cue control element 58A and a first play/stop control element 60A may be provided for transport control of song A, while at least one of a second scratch control element 54B, a second routing control element 56B, a second cue control element 58B and a second play/stop control element 60B may be provided for transport control of song B.

With reference to song A, routing control element 56A may provide to the user a selection of one or more audio tracks as a destination for the transport control of song A. In the present example, a user may select to route the transport control to one or more specified decomposed tracks (for example a vocal track, a harmonic track or a drum track) or to the combined or sum signal of song A. Thus, any transport control as controlled by any of the remaining control elements 54A, 58A, 60A will only affect the audio track or audio tracks selected through routing control element 56A.

Scratch control element 54A may as such be configured according to a standard jog wheel of a DJ device, for example by visualizing a turntable that can be operated by a user to spin forward or backward. Such operation will control transport control unit 28 to perform a transport control on the audio track selected through routing control element 56A, wherein the transport control is a scratching effect (repeated forward and backward playback of a time interval of the audio data at the current playback position).

Cue control element 58A is another standard control element known as such to a DJ as a push button or the like to store a current playback position during playback of the audio data, and to retrieve the stored position at any point in time later on. According to the embodiment of the present invention, the cue jump is carried out only for the audio track selected through routing control element 56A, which means that upon a first operation of cue control element 58A a current playback position is stored and upon a second operation of a cue control element 58A only the audio track selected through routing control element 56A will stop playing and will jump back (or forth) to the stored position. As a result, the selected audio track will then be shifted with respect to the remaining audio tracks. For example, if the decomposed drums track is selected through routing control element 56A, a first operation of cue control element 58A will store the current playback position while a second operation of cue control element 58A will shift the decomposed drum track to the position previously stored through the first operation of cue control element 58A, while the remaining decomposed tracks (in particular decomposed vocal track and the decomposed harmonic track) will not be shifted, and playback of these audio tracks is continued without a change.

Play/stop control element 60A may be operated to start or stop playback of the audio track selected through routing control element 56A. Thus, if for example the decomposed drum track is selected through routing control element 56A, operation of play/stop control element 60A will start or stop playback of only the decomposed drum track, whereas the remaining audio tracks will continuously be played back without change.

The control elements 54B, 56B, 58B, and 60B associated to song B may have corresponding functions to apply transport control to audio tracks of song B. Furthermore, user control section 46 may include a crossfader 62, which can be operated by a user to crossfade between song A and song B as known as such for DJ equipment.

FIG. 3 shows a layout of a user control section 46 according to a second embodiment of the present invention. Only the differences to the first embodiment will be described in more detail, and reference is made to the description of the first embodiment for all other features.

Instead of a routing control element, the second embodiment uses separate groups of control elements for transport control of the individual audio tracks, in particular the individual decomposed tracks. In the present example, for song A, a first group of control elements 64A-1 is provided, which includes a plurality of control elements related to a transport control of (only) a first decomposed track, for example a decomposed instrumental track, and a second group of control elements 64A-2 may be provided, which includes a plurality of control elements related to a transport control of (only) a second decomposed track, for example a decomposed vocal track. Both groups 64A-1 and 64A-2 may include an activation control element 68, a parameter control element 70 and a selection control element 72. The activation control element 68 may be operated to start or stop application of the transport control to the assigned decomposed track. The parameter control element 70 may be configured to set at least one parameter of the transport control, such as for example a duration of a vinyl break. The selection control element 72 may be configured to allow a user to select a transport control among a number of predefined transport controls. Corresponding control elements 68, 70 and 72 or other control elements may be provided for the second group 64A-2. Furthermore, one or more of the groups 64A-1, 64A-2 may additionally be provided in a corresponding configuration as groups 64B-1 and 64B-2, respectively, for song B.

In the embodiment of FIG. 3, there may also be provided cue control elements 58 and/or play/stop control elements 60 for each of songs A and B, wherein in this embodiment, these control elements will preferably operate transport control of a sum signal of song A and song B, respectively.

A modification of the control element groups 64A-1 and 64A-2 according to the present invention is shown in FIG. 4. It can be seen that the parameter control element 70 can be set to specific predetermined values based on a tempo of the music (a BPM value of song A, for example as detected by a BPM detection unit of the device or input by the user or through metadata of the song). The transport control may thus be adapted to a proper timing to match the beat of the song.

FIG. 5 shows a user control section 46 according to a third embodiment of the present invention, which again is a modification of the first embodiment, such that only modified features and functions will be described herein and reference is made to the description of the first embodiment for all other features and functions.

In the third embodiment, the user control section comprises a plurality of transport control sections 74A-1, 74A-2, 74A-3 for song A and a plurality of transport control sections 74B-1, 74B-2, 74B-3 for song B. The transport control sections are in this embodiment configured to control the same type of transport control, for example a loop control; however, they may each be set to apply the transport control to a different audio track, in particular a different decomposed track. For example, in the present example, the first transport control section 74A-1 applies a loop control to the decomposed drum track, the second transport control section 74A-2 applies a loop control to the decomposed harmonic track, and the third transport control section 74A-3 applies a loop control to the decomposed vocal track. Each transport control section 74A-1, 74A-2, 74A-3 may include an activation control element 68 for starting or stopping application of the transport control, a parameter control element 70 to set a parameter of the transport control, for example a time interval to be looped, and a routing control element 56, which allows a selection of the decomposed track or any other audio track to which the transport control is to be applied according to the settings of the particular transport control section. The transport control sections 74B-1, 74B-2, 74B-3 associated to song B may be configured in a similar manner as those for song A.

FIG. 6 shows a modification of the transport control sections 74A-1, 74A-2, 74A-3 of the third embodiment, in which the parameter control element 70 may be set to select a parameter of the transport control according to a tempo value of song A as detected by a BPM detection unit or input by a user or through metadata of song A. In addition, a transport control parameter, for example a loop interval, may be set by a user through a tap button 71, which can be tapped repeatedly, wherein the device determines the transport control parameter based on the timing of the tapping operation. In the present example, a user has activated the tap button 71 at a frequency corresponding to 120.5 BPM.

In the following a transport control method for a transport control of audio data as applicable in the first and/or second embodiment of the invention will be described with reference to FIG. 7.

Input audio data received by the device may contain a plurality of consecutive input frames if1, if2, if3, . . . containing digital values a, b, c, . . . l each representative of a mean audio signal within one sample period of the audio data. Continuous playback of the input frames if1, if2, if3, . . . results in playback of the first piece of music. The input audio data are decomposed, which is usually done by decomposing packages of a number of input frames within trained neural network of an AI system to obtain packages of decomposed frames and remerging the packages of decomposed frames to obtain a consecutive row of decomposed audio frames. In this way, several decomposed data are obtained according to the number of different timbres separated by the AI system, each decomposed data comprising a consecutive number of frames, wherein each frame contains a decomposed portion of the audio data of an associated input frame.

In the present example, the input audio data are decomposed to obtain first-timbre decomposed data and second-timbre decomposed data. Each frame of the decomposed data is associated to a particular input frame as denoted in FIG. 7 by using the same letter. For example, a first frame fd1 of the first-timbre decomposed data is associated to a first input frame if1 and therefore contains the first-timbre component a' of the audio signal a contained in the first input frame if1. Moreover, a first frame sd1 of the second-timbre decomposed data is associated to the first input frame if1 as well and therefore contains the second-timbre component a" of the audio signal a contained in the first input frame if1.

In the step of recombining the first-timbre decomposed data with the second-timbre decomposed data, the frames fd1, fd2, . . . of the first-timbre decomposed data are recombined biuniquely, i.e. one-to-one, with the frames sd1, sd2, . . . of the second-timbre decomposed data to obtain frames ra1, ra2, . . . of recombined audio data. In particular, the audio signals a' and a" of the first frames fd1 and sd1 of the first- and second-timbre decompose data, respectively, are recombined to obtain the first frame ra1 of recombined audio data. Furthermore the audio signals b' and b" of the next, second frames fd2 and sd2 of the first- and second-timbre decompose data, which immediately follow the first frames fd1 and sd1, are recombined to obtain the immediately following, second frame ra2 of recombined audio data.

As can be seen in FIG. 7, in the present example, the transport control, for example applied by the transport control unit 28, controls association of a first group of frames fd1, fd2, . . . of the first-timbre decomposed data with to their respective input frames if1, if2, . . . , such that the association is different from the association of the corresponding frames sd1, sd2, . . . of the second-timbre decomposed data to the input frames if1, if2, . . . . For example, while the third frame sd3 of the second-timbre decomposed data is associated to the third input frame if3 as it contains the second-timbre audio signal component c" of the audio signal c contained in the third input frame if3, the third frame fd3 of the first-timbre decomposed data in the first group (to which the transport control is applied) is associated to the first input frame if1 as it contains the first-timbre audio signal component a' of the audio signal a contained in the first input frame if1. The result is that in the step of recombination of the frames, there will be a recombination of at least one pair of frames (for example fd3 and sd3) which are associated to different input frames (in the example if1 and if3), which means that there will be a recombination of audio signals originating from decomposition of different input audio signals (in the example a recombination of a' originating from a, with c" originating from c). A corresponding time interval which contains the first group of frames can be denoted as a control time interval or a time interval in which the transport control is applied.

In the illustrated example, the transport control is applied to only the first-timbre decomposed data, which means that all consecutive frames sd1, sd2, . . . sd12 of the second-timbre decomposed data are associated biuniquely and in the same order to consecutive input frames if1, if2, . . . if3 of the input audio data. This means that the second-timbre decomposed data run with the same relative timing as the input audio data, and thus run independent of the time shifts applied by the transport control to the first-timbre decomposed data.

In addition, within a time interval outside the control time interval, a second group of frames fd7, . . . , fd12 and sd7, . . . , sd12 of the first- and second-timbre decomposed data are again synchronized to each other, which means that frames of the first- and second-timbre decomposed data which have the same frame number are associated to the same input frames if7, . . . , if12. This means that the audio signals of the frames that are recombined will always originate from decomposition of the same audio signal (contained in the same input frame). If the first- and second-timbre decomposed data are complements, this further means that outside the control time interval the recombined audio data are substantially equal to the input audio data (except for changes brought by volume changes or sound effects applied to individual but not all decomposed data and except of inaccuracies of the decomposition algorithm).

The invention claimed is:

1. A method for processing music audio data, comprising:
   providing input audio data representing a first piece of music comprising a mixture of musical timbres;
   decomposing the input audio data to generate at least first-timbre decomposed data representing a first timbre selected from the musical timbres of the first piece of music, and second-timbre decomposed data representing a second timbre selected from the musical timbres of the first piece of music;
   applying a transport control, to obtain transport controlled first-timbre decomposed data; and
   recombining audio data obtained from the transport controlled first-timbre decomposed data with audio data obtained from the second-timbre decomposed data to obtain recombined audio data.

2. The method of claim 1, wherein in a time interval after application of the transport control, the transport controlled first-timbre decomposed data and the second-timbre decomposed data are synchronized to one another.

3. The method of claim 1,
   wherein the mixture of musical timbres comprise at least the first timbre and the second timbre, wherein the second timbre is different from the first timbre, the input audio data being formed by a plurality of consecutive input frames, and further comprising:
      decomposing the input audio data to obtain first-timbre decomposed data representing the first timbre and second-timbre decomposed data representing the second timbre, such that frames of the first-timbre decomposed data are associated to associated input frames and include a first-timbre component of the associated input frames, and frames of the second-timbre decomposed data are associated to associated input frames and include a second-timbre component of the associated input frames, wherein a first frame of the first-timbre decomposed data and a first frame of the second-timbre decomposed data are associated to different input frames; and
      recombining the first frame of the first-timbre decomposed data with the first frame of the second-timbre decomposed data to obtain a first frame of recombined audio data.

4. The method of claim 3, further comprising:
   recombining a second frame of the first-timbre decomposed data with a second frame of the second-timbre decomposed data to obtain a second frame of recombined audio data,
   wherein the second frame of the first-timbre decomposed data and the second frame of the second-timbre decomposed data are associated to a same input frame.

5. The method of claim 3, wherein the second-timbre decomposed data include a plurality of consecutive frames associated biuniquely and in the same order to consecutive input frames of the input audio data.

6. The method of claim 1,
   wherein the first-timbre decomposed data and the second-timbre decomposed data each include a first group having a plurality of frames and a second group having a plurality of frames,
   wherein the first group of the first-timbre decomposed data and the first group of the second-timbre decomposed data have the same number of frames, and the second group of the first-timbre decomposed data and the second group of the second-timbre decomposed data have the same number of frames,
   wherein, in the step of recombining, frames of the first group of the first-timbre decomposed data are recombined biuniquely with frames of the first group of the second-timbre decomposed data, and frames of the second group of the first-timbre decomposed data are recombined biuniquely with frames of the second group of the second-timbre decomposed data.

7. The method of claim 6, wherein, when recombining the frames of the first groups of the first-timbre decomposed data and the second-timbre decomposed data, frames are recombined with one another which are associated to different input audio frames, and when recombining the frames of the second groups of the first-timbre decomposed data and the second-timbre decomposed data, frames are recombined with one another which are associated to the same input audio frames.

8. The method of claim 7, further comprising:
   providing a transport control setting associations between frames of the first-timbre decomposed data and the associated input audio frames such that each frame contains a first-timbre component of the associated input audio frame.

9. The method of claim 1, wherein the transport control includes one or more of:
   a loop effect,
   a beat roll effect,
   a back spin effect,
   a scratch effect,
   a vinyl brake,
   a stop control,
   a play control, or
   a cue jump.

10. The method of claim 1, wherein:
the first musical timbre is a harmonic vocal timbre or a harmonic instrumental timbre; and/or
the second musical timbre is a non-harmonic vocal timbre or a non-harmonic instrumental timbre.

11. The method of claim 1, further comprising: further processing the recombined audio data, wherein the further processing includes one or more of storing the recombined audio data in a storage unit, playing back the recombined audio data by a playback unit, or mixing the recombined audio data with second-song output data.

12. The method of claim 11, wherein one or more of obtaining the recombined audio data or further processing the recombined audio data is performed within a time smaller than five (5) seconds, after a start of the decomposing of the input audio data.

13. The method of claim 1, further comprising:
providing second-song input data representing a second piece of music;
obtaining second-song output data from the second-song input data; and
mixing the recombined audio data with the second-song output data to obtain sum output data.

14. The method of claim 1, further comprising:
determining a tempo shift value representative of a difference between a first tempo of the first piece of music and a second tempo of the second piece of music; and
shifting, according to the tempo shift value and before the step of mixing the recombined audio data with second-song output data, one or more of a tempo of audio data related to the first piece of music or audio data related to the second piece of music to obtain sum output data.

15. A device for processing music audio data, comprising:
an input unit for receiving input audio data representing a first piece of music comprising a mixture of predetermined musical timbres;
a decomposition unit for decomposing the input audio data received from the input unit to generate at least a first decomposed track representing a first musical timbre selected from the predetermined musical timbres of the first piece of music and a second decomposed track representing a second musical timbre selected from the predetermined musical timbres of the first piece of music;
a transport control unit adapted to be operated for applying a transport control for controlling transport of the first decomposed track with respect to time; and
a recombination unit for recombining audio data obtained from the first decomposed track with audio data obtained from the second decomposed track to obtain recombined audio data.

16. The device of claim 15, wherein the entire second decomposed track has the same timing as the input audio data, wherein the first decomposed track has a timing different from a timing of the input audio data within a transport control interval in which the transport control is applied, and wherein the first decomposed track has a same timing as the input audio data outside the transport control interval.

17. The device of claim 15, wherein the transport control changes timing of audio data.

18. The device of claim 15, further comprising:
a first audio path for transmitting audio data of the first decomposed track from the decomposition unit via the transport control unit to the recombination unit;
a second audio path for transmitting audio data of the first decomposed track from the decomposition unit to the recombination unit while bypassing the transport control unit; and
a path switch for switching the device between transmission of audio data via the first audio path and transmission of audio data via the second audio path.

19. The device of claim 15, wherein the transport control unit comprises one or more of a jog wheel, a play/pause/ button, a cue jump button, or a loop button for controlling the transport control.

20. The device of claim 15, wherein the transport control unit comprises an audio buffer adapted to store, within the audio buffer, audio data obtained from applying the transport control to audio data of the first decomposed track.

21. The device of claim 20, wherein the transport control unit comprises a switch control element adapted to be operated to control the path switch.

22. The device of claim 15, wherein the transport control unit comprises a parameter control element, configured to allow a control of at least one timing parameter of the transport control.

23. The device of claim 15,
wherein the transport control unit comprises a routing control element configured to allow a selection of a destination track from a group of at least two different audio tracks, each of the group of different audio tracks being derived from the input audio data, wherein the group in particular includes one or more decomposed tracks, a combination of the one or more decomposed audio tracks, or an audio track formed by audio data substantially equal to the input audio data, and
wherein the transport control unit applies the transport control to the destination track.

24. The device of claim 15, wherein the decomposition unit includes an artificial intelligence (AI) system comprising a neural network, wherein the neural network is trained to separate audio data of a predetermined musical timbre from audio data comprising a mixture of different musical timbres.

25. The device of claim 15, further comprising one or more of (a) a storage unit configured to store the recombined audio data, (b) a playback unit adapted to play back the recombined audio data, or (c) a mixing unit adapted to mix the recombined audio data with second-song output data.

26. The device of claim 15, further comprising:
a second-song input unit for providing second-song input data representing a second piece of music;
a mixing unit adapted to mix the recombined audio data with audio data obtained from the second-song input data, such as to obtain sum output data; and
preferably a playback unit adapted to play back playback data obtained from the sum output data.

27. The device of claim 26, further comprising:
a tempo shift calculation unit for determining a tempo shift value representative of a difference between a first tempo of the first piece of music and a second tempo of the second piece of music; and
a tempo shifting unit for shifting a tempo of one or more of audio data related to the first piece of music or audio data related to the second piece of music according to the tempo shift value.

28. The device of claim 26, further comprising a crossfading unit having a crossfading controller that can be manipulated to assume a control position within a control range, wherein the crossfading unit sets a first volume level related to the input audio data and a second volume level related to the second-song input data depending on the control position of the crossfading controller, such that the first volume level is maximum and the second volume level is minimum when the crossfading controller is at one end point of the control range, and the first volume level is minimum and the second volume level is maximum when the crossfading controller is at the other end point of the control range.

29. The device of claim 26, further comprising a computer having a microprocessor, a storage unit, an input interface, and an output interface, wherein at least the input unit, the decomposition unit, the transport control unit and the mixing unit are formed by a software program running on the computer.

30. The device of claim 29, wherein the software program is configured to run on the computer to control the computer such as to carry out one or more functions of the input unit, the decomposition unit, the transport control unit, and the mixing unit.

* * * * *